United States Patent [19]
Matsubara et al.

[11] Patent Number: 5,630,190
[45] Date of Patent: May 13, 1997

[54] FOCAL PLANE SHUTTER AND METHOD FOR FORMING THE SAME

[75] Inventors: Takashi Matsubara; Masanori Hasuda, both of Yokohama, Japan

[73] Assignee: Nikon Corporation, Tokyo, Japan

[21] Appl. No.: 665,298

[22] Filed: Jun. 17, 1996

Related U.S. Application Data

[63] Continuation-in-part of Ser. No. 498,844, Jul. 6, 1995, abandoned.

[30] Foreign Application Priority Data

Jul. 6, 1994 [JP] Japan ................................ 6-177594
Jun. 15, 1995 [JP] Japan ................................ 7-174235

[51] Int. Cl.$^6$ ................................................ G03B 9/40
[52] U.S. Cl. ................................................ 396/488
[58] Field of Search ........................... 396/488, 483, 396/484, 487, 491, 492, 497, 501

[56] References Cited

U.S. PATENT DOCUMENTS

| | | | |
|---|---|---|---|
| 4,482,231 | 11/1984 | Kato et al. .................... | 354/246 |
| 4,660,952 | 4/1987 | Toyoda et al. .................. | 354/246 |
| 4,992,813 | 2/1991 | Matsubara ...................... | 354/246 |
| 5,025,278 | 6/1991 | Matsubara ...................... | 354/246 |
| 5,475,459 | 12/1995 | Matsubara et al. ............. | 354/246 |

FOREIGN PATENT DOCUMENTS

59-61827  4/1984  Japan .

*Primary Examiner*—Safet Metjahic
*Assistant Examiner*—John Chizmar
*Attorney, Agent, or Firm*—Oliff & Berridge

[57] ABSTRACT

A focal plane shutter provides an extremely durable and reliable super-high speed shutter with speeds of greater than 1/8000 second which minimizes increases in the charge energy, has an increased rate of acceptance of the FRP and is economical to produce. The blades will not collide with or be damaged by the intermediate plate and the light shielding plate, even when the shutter is released while accelerating the camera in a direction virtually perpendicular to the direction of movement of the blades. The focal plane shutter includes a front and a rear blind that each include multiple dividing blades. The rigidity of the slit-forming blades having the largest amount of movement among the dividing blades differs between the front blind and the rear blind.

39 Claims, 6 Drawing Sheets

FOCAL PLANE SHUTTER AND METHOD FOR FORMING THE SAME

This is a Continuation-in-Part of application Ser. No. 08/498,844, filed Jul. 6, 1995, now abandoned.

BACKGROUND OF THE INVENTION

1. Field of the Invention

The present invention relates to a focal plane shutter used in a camera.

2. Description of Related Art

In recent years, due to demands for improvement of film sensitivities and new image expressions, it has been necessary to move toward higher speeds in terms of camera shutter speeds and strobe alignment speeds, and cameras have been realized with shutter speeds as fast as $\frac{1}{8000}$ second and alignment speeds as fast as $\frac{1}{250}$ second. With this type of focal plane shutter, fast shutter speeds that exceed the strobe alignment speed are produced by moving the front blind (or curtain) and rear blind (or curtain) with shifted timing and by carrying out slit exposure with a gap (slit) between the first blade of the front blind and the first blade of the rear blind being fixed at a certain gap distance, or with the gap being varied according to the speed.

The shutter includes four or five dividing blades (light shielding blades) and a driving mechanism that drives the blades. The material from which these light shielding blades are formed can be fiber reinforced plastic (referred to hereafter as FRP), aluminum, or the like. Alternatively, combinations of the above can be used, such as, when four blades are used, the two blades with the greatest amount of movement can be formed from FRP, while the two blades with the least amount of movement can be formed from aluminum.

FRP, as disclosed in Japanese Laid-Open Patent Publication Sho 59-61827, uses carbon fibers aligned in one direction as the reinforcing fibers, and uses epoxy resin as a matrix resin. FRP has multiple layers of prepreg sheets (which are intermediate products) with the direction of the fibers of each sheet being perpendicular or virtually perpendicular to that of the sheets on either side. FRP is manufactured by pressing the prepeg layers together and applying heat, thus causing them to be vulcanized. FRP material that has been thus manufactured is cut into the desired light shielding blade shape. The cutting is generally done by stamping with a press.

Blades made from FRP are lightweight and have a high bending rigidity. At high shutter speeds of $\frac{1}{8000}$ second, shaking or oscillation of the blades during movement and directly after stopping is extremely small, and even if the next shutter action is carried out while the blade is shaking, the blade will not collide with the other blades or with the aperture (the device that determines the field angle) and be damaged, the shutter will not become inoperable, and hence it becomes possible to achieve an extremely high durability. Even if there is temporary shaking with FRP, the shaking condition is quickly absorbed, when compared, for example, to an aluminum-type blade.

However, the diameter of the carbon fibers is 3 to 8 μm, and if the alignment is bad, there will be localized increases or decreases in the number of fibers, causing non-uniformity in strength and irregularities in flatness. In addition, blades warp for various reasons when used for extended periods of time. Because these types of blades have large variations in thickness, they are discarded during manufacturing before assembly into the camera. Blades that appear inferior are also discarded, such as those that have experienced failures in layering or that have scratches or the like. Furthermore, a number of blades warp when a coating is applied, which blades are also discarded. Thus, FRP-type blades are extremely time consuming from the standpoint of quality control, and the acceptance rate is low. Moreover, FRP-type blades are extremely expensive.

In the case of aluminum-type blades, because rejects and problems in quality control are extremely small when compared with FRP, aluminum blades have a cost advantage over FRP. However, the weight of the blades becomes fairly heavy, which increases the charge energy. Additionally, shaking during movement and directly after stopping is extremely large, and because this shaking condition is not easily absorbed, the durability is markedly inferior to a shutter with FRP-type blades.

Recently, it has come to be realized that, under specialized usage conditions in which photography is performed while the camera is moving, namely, in conditions in which the shutter is released while a strong acceleration is applied in a direction nearly perpendicular to the direction of travel of the blades, there is a strong possibility that the blades will be damaged by colliding with an intermediate plate and/or a light shielding plate that separates the front blind and rear blind, even if the blades are formed from FRP.

More recently, even faster super-high speed shutters are being requested that have speeds exceeding $\frac{1}{8000}$ second. In order to respond to these demands, it is necessary not only to prevent the collision and damage problems described above, but also to minimize increases in the charge energy, while further improving the quality of these products and keeping costs down.

SUMMARY OF THE INVENTION

The present invention has been conceived in light of the problem stated above, and has an object of providing, easily and at low cost, a super-high speed shutter faster than $\frac{1}{8000}$ second which eliminates collisions with and damage of the blades by the intermediate plate and light shielding plate even under special usage conditions, minimizes increases in the charge energy, has an increased rate of acceptance of the FRP and reduced costs, and has extremely high durability and reliability.

In order to achieve the above and other objectives, the focal plane shutter of the present invention comprises a driving mechanism that drives a front blind and a rear blind. Each of the front blind and the rear blind has multiple dividing blades including a slit-forming blade, wherein the slit-forming blade of the front blind and the slit-forming blade of the rear blind are movable with respect to each other to form a slit of a predetermined width between the front blind and the rear blind. A rigidity of the slit-forming blade having the largest amount of movement among the dividing blades differs between the front blind and the rear blind. The rigidity of the slit-forming blade of the rear blind is increased and larger than the rigidity of the slit-forming blade of the front blind. The thickness of the blade having the second largest amount of movement is, in the front blind, the same as that of the blade having the largest amount of movement, and in the rear blind, is thinner than the blade having the largest amount of movement.

In the focal plane shutter having the above-described structure, the rigidity of the slit-forming blade of the rear blind may be greater than the rigidity of the slit-forming blade of the front blind, thereby improving mobility of the rear blind, decreasing shaking of the blades during movement and directly after stopping, and reducing the possibility of damage to the blades caused by collisions with the intermediate and/or light shielding plates. The thickness of the blades having the second largest amount of movement is, in the front blind, the same as that of the blade having the largest amount of movement, and in the rear blind, is thinner than the blade having the largest amount of movement. The resultant focal plane shutter has superior rigidity and weight balance. The super-high speed shutter (faster than 1/8000 second) eliminates collisions with and damage of the blades by the intermediate plate and light shielding plate, minimizes increases in the charge energy, has an increased rate of acceptance of the FRP and reduced costs, and has extremely high durability and reliability.

According to a second aspect of the invention, there is provided a front blind and a rear blind each having multiple dividing blades including a slit-forming blade, wherein a slit-forming blade of the front blind and the rear blind are movable with respect to each other to form a slit of a determined width between the front blind and the rear blind. A driving mechanism drives the front blind and rear blind. The rigidity of the slit-forming blade of the front blind is different from the rigidity of the slit-forming blade of the rear blind.

According to a third aspect of the invention, there is provided a front blind and a rear blind movably connected to a base plate. The front blind and rear blind each have slit-forming blades which cooperate with each other to establish an exposure slit therebetween. The slit-forming blade of the front blind and the slit-forming blade of the rear blind have different rigidities.

According to a fourth aspect of the invention, there is provided a method for forming a focal plane shutter of a camera having a front blind and a rear blind that each have a slit-forming blade and a plurality of dividing blades. The slit-forming blades are movable with respect to each other to form a slit of a predetermined width between the front and rear blinds. The method for forming a focal plane shutter comprises selecting a material for each of the blades according to each blades relative degree of movement and dimensioning the blades to reduce the possibility of collisions among the blades and with other components of the camera. Collisions are avoided by dimensioning the front slit-forming blade with a thickness less than the thickness of the rear slit-forming blade.

According to a fifth aspect of the invention, there is provided a second method for forming a focal plane shutter of a camera. Again, the camera has a front blind and a rear blind that each have a slit-forming blade and a plurality of dividing blades. The front and rear slit-forming blades are movable with respect to each other to form a slit of a predetermined width. The second method for forming a focal plane shutter comprises selecting a material for each of the blades according to each blade's relative degree of movement and dimensioning the blades to reduce the possibility of collisions among the blades and with other components of the camera. Collisions are avoided by forming a blade having the largest amount of movement of the rear blind with greater rigidity than a blade having a largest amount of movement of the front line.

These and other aspects and advantages of the present invention are described in or apparent from the following detailed description of preferred embodiments.

BRIEF DESCRIPTION OF THE DRAWINGS

Preferred embodiments are described with reference to the drawings in which.

DETAILED DESCRIPTION OF PREFERRED EMBODIMENTS

The embodiments of the present invention will be described below based on the drawings.

FIG. 1 to FIG. 6 are drawings that show the first embodiment of the focal plane shutter of the present invention.

Figure 1:
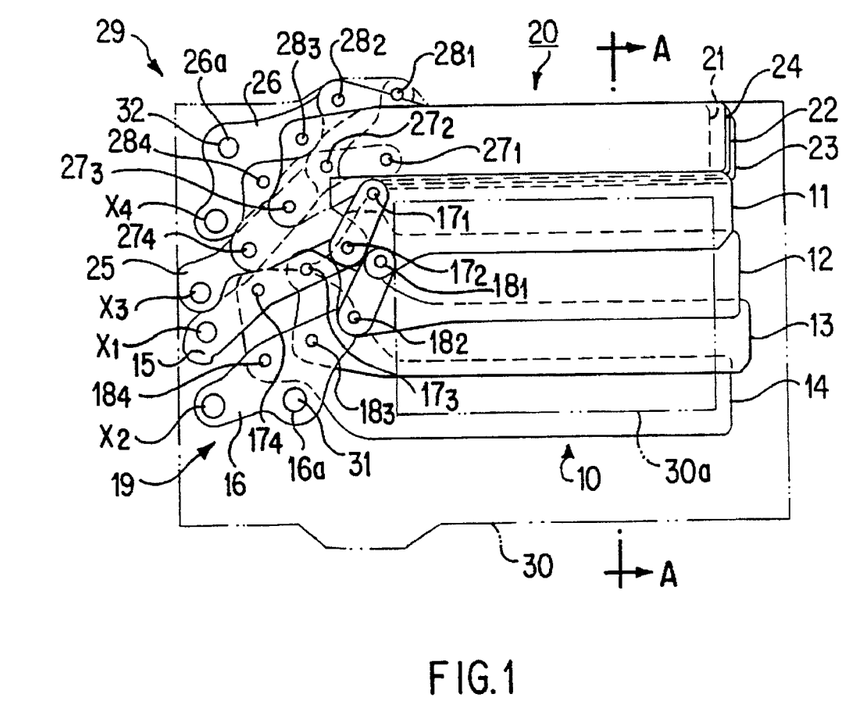
FIG. 1 is a frontal view showing an embodiment of the focal plane shutter of the present invention in which the front blind is closed and the exposure slit is covered.

The focal plane shutter of this embodiment comprises a front blind 10, a rear blind 20 and a shutter base plate 30. The front blind 10 comprises four dividing blades 11–14. The arms 15 and 16 support the dividing blades 11–14. The arms 15 and 16 are connected to shafts X1 and X2, which are attached to the shutter base plate 30, in a manner that allows the arms 15 and 16 to rotate. The dividing blades 11–14 are each connected to the arm 15 and to the arm 16 by self-locking pins 171–174 and self-locking pins 181–184, in a manner that allows the blades 11–14 to rotate. A driving shaft 31 is attached through a hole 16a of the arm 16. The driving shaft 31 receives a driving force from a commonly known shutter driving device during shutter driving and opens and closes the front blind 10.

Similarly, the rear blind 20 comprises four dividing blades 21–24 supported by arms 25 and 26. The arms 25 and 26 are connected to shafts X3 and X4, which are attached to the shutter base plate 30, in a manner that allows the arms 25 and 26 to rotate. The dividing blades 21–24 are each connected to the arm 25 and to the arm 26 by self-locking pins 271–274 and self-locking pins 281–284, in a manner that allows the blades to rotate. A driving shaft 32 is attached through a hole 26a of the arm 26. The driving shaft 32 receives the driving force from a commonly known shutter driving device during shutter driving and opens and closes the rear blind 20.

The arms 15 and 16, the arms 25 and 26, the shafts X1 to X4, the self-locking pins $17_1$–$17_4$ and $18_1$–$18_4$, the self-locking pins $27_1$–$27_4$ and $28_1$–$28_4$, and the driving shafts 31 and 32 form driving mechanisms 19 and 29, which move the dividing blades 11–14 and the dividing blades 21–24.

The shutter blinds of the present embodiment will next be described in greater detail.

Figure 3:
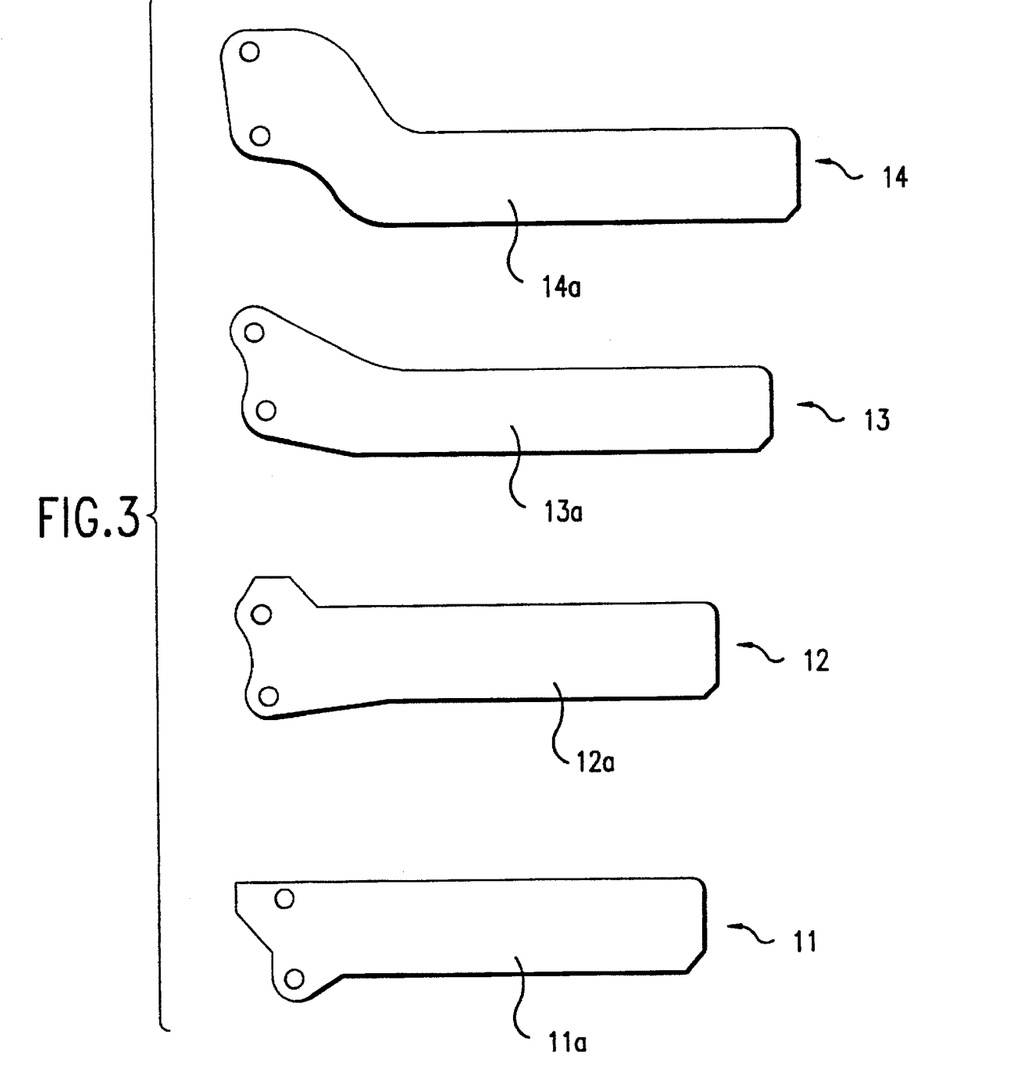
FIG. 3 is a disassembled view showing the dividing blades of the front blind of the focal plane shutter of the present invention.
Figure 4:
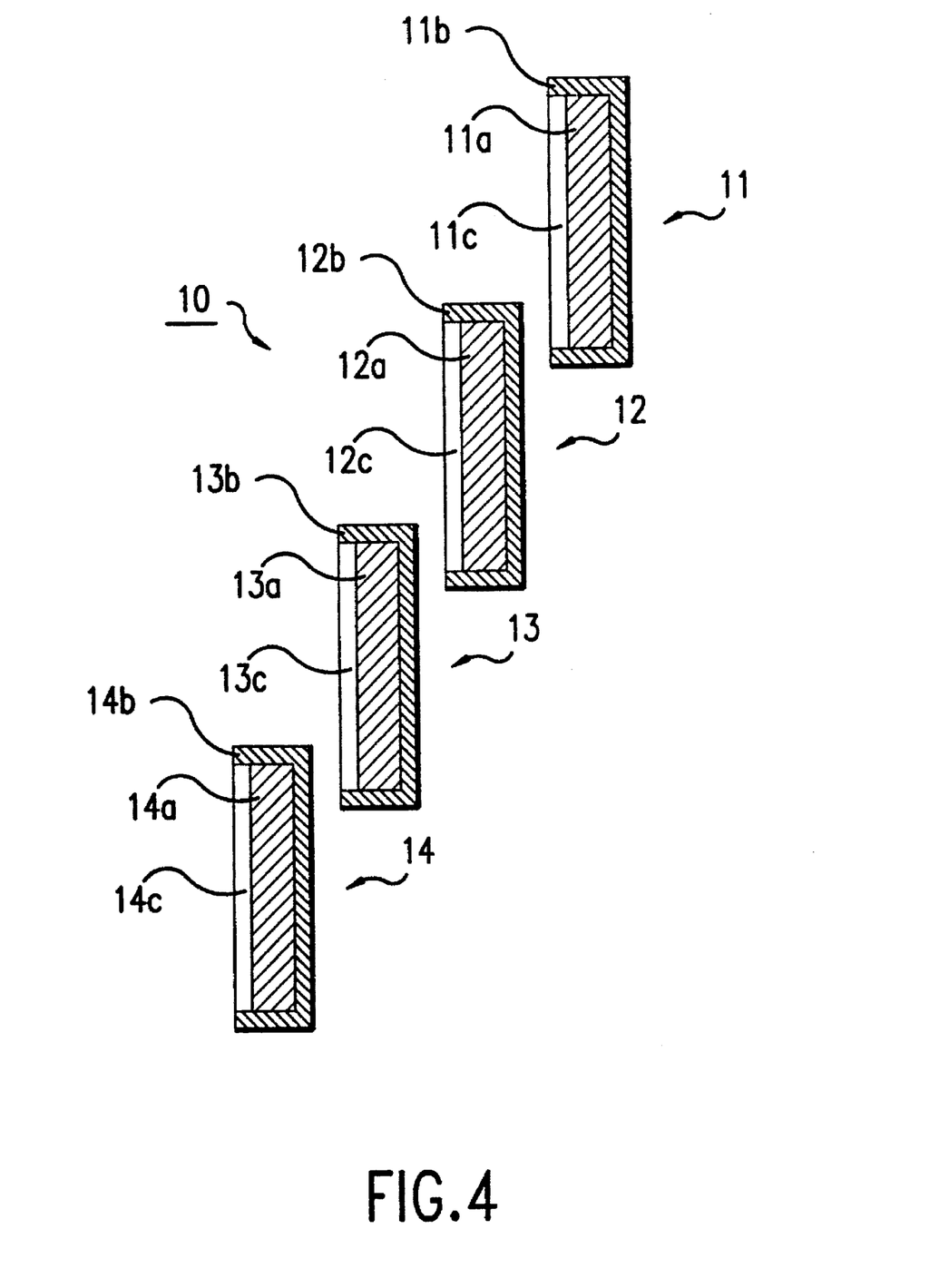
FIG. 4 is a cross section showing an enlargement in the direction of thickness of the dividing blades of the front blind in the focal plane shutter of the present invention.

The front blind 10 will first be described with reference to FIG. 3 and FIG. 4. Blades 11a and 12a are formed by stamping specified blade shapes from FRP with a thickness of about 90 µm to 100 µm, and the blades 13a and 14a are formed by stamping specified blade shapes from an aluminum alloy with a thickness of about 50 µm to 70 µm. A whitening coating with a thickness of 3 to 6 µm is applied to the lens-side surfaces of the blades 11a–14a, forming high reflectivity components 11c–14c (FIG. 4). A blackening coating with a thickness of 3 to 6 µm is applied to the film-side surfaces and slit-side edge surfaces of the blades 11–14, forming low reflectivity components 11b–14b. The reflectivity of the whitening coating is 7 to 30%, while the reflectivity of the blackening coating is below 15%, being preferably not greater than 9%, and even more preferably not greater than 6%. The arms 15 and 16 are connected to the dividing arms 11–14, completing the front blind 10.

For the rear blind, a slit-forming blade 21a (FIG. 5) is formed by stamping a specified blade shape from FRP with a thickness of about 100 µm to 110 µm. The rest of the blades 22–24 are formed in the same manner as for the front blind 10, by stamping specified blade shapes from FRP and aluminum alloy. A blackening coating of 3 to 6 µm is applied over all the surfaces, completing the formation of the blades 21–24. As with the front blind, the arms 25 and 26 are connected to the dividing blades 21–24, completing the rear blind 20. The elastic modulus of the carbon fibers of the CFRP used here is approximately 24,000 kg/mm².

Figure 5:
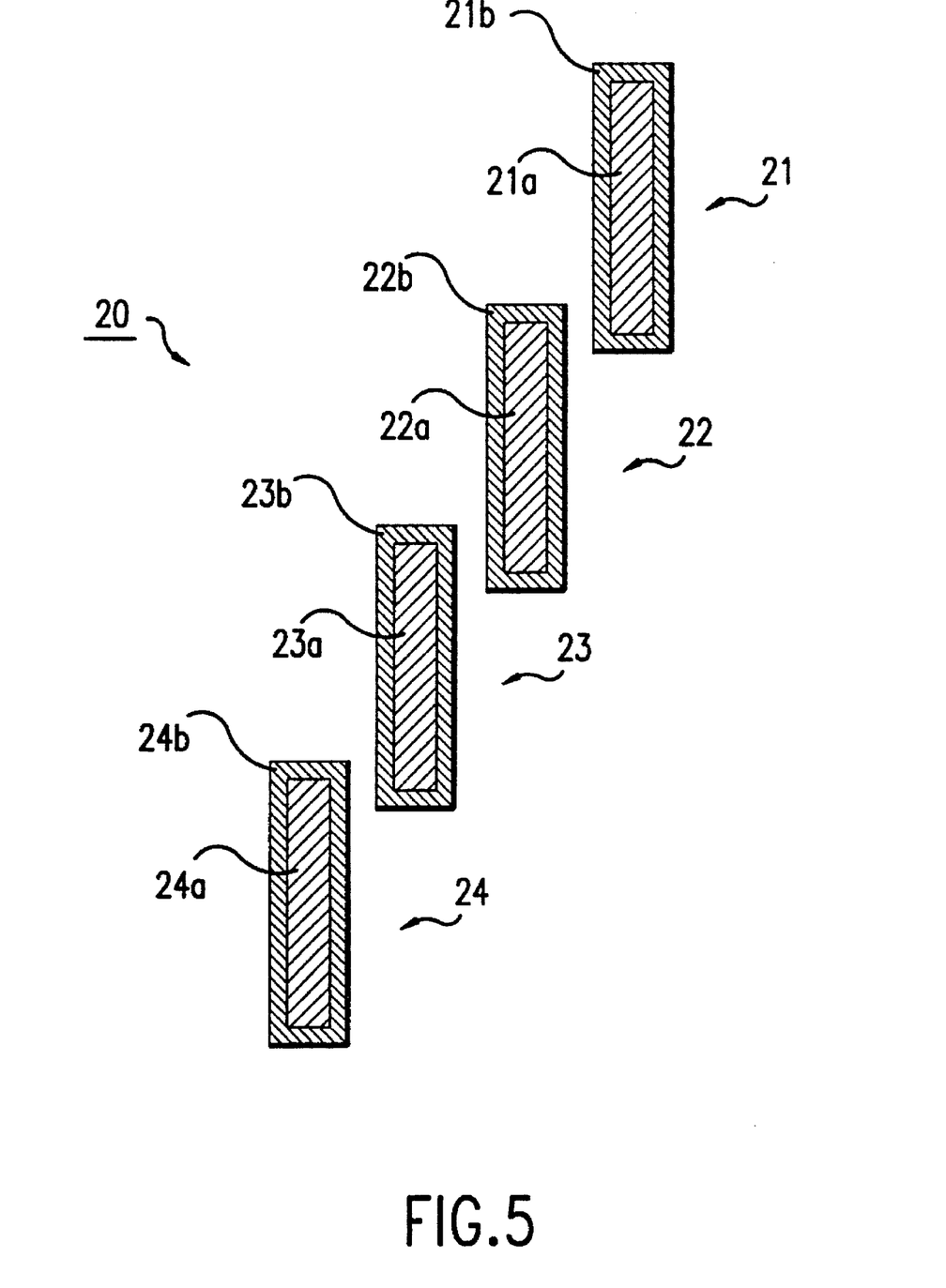
FIG. 5 is a cross section showing an enlargement in the direction of thickness of the dividing blades of the rear blind in the focal plane shutter of the present invention.
Figure 6:
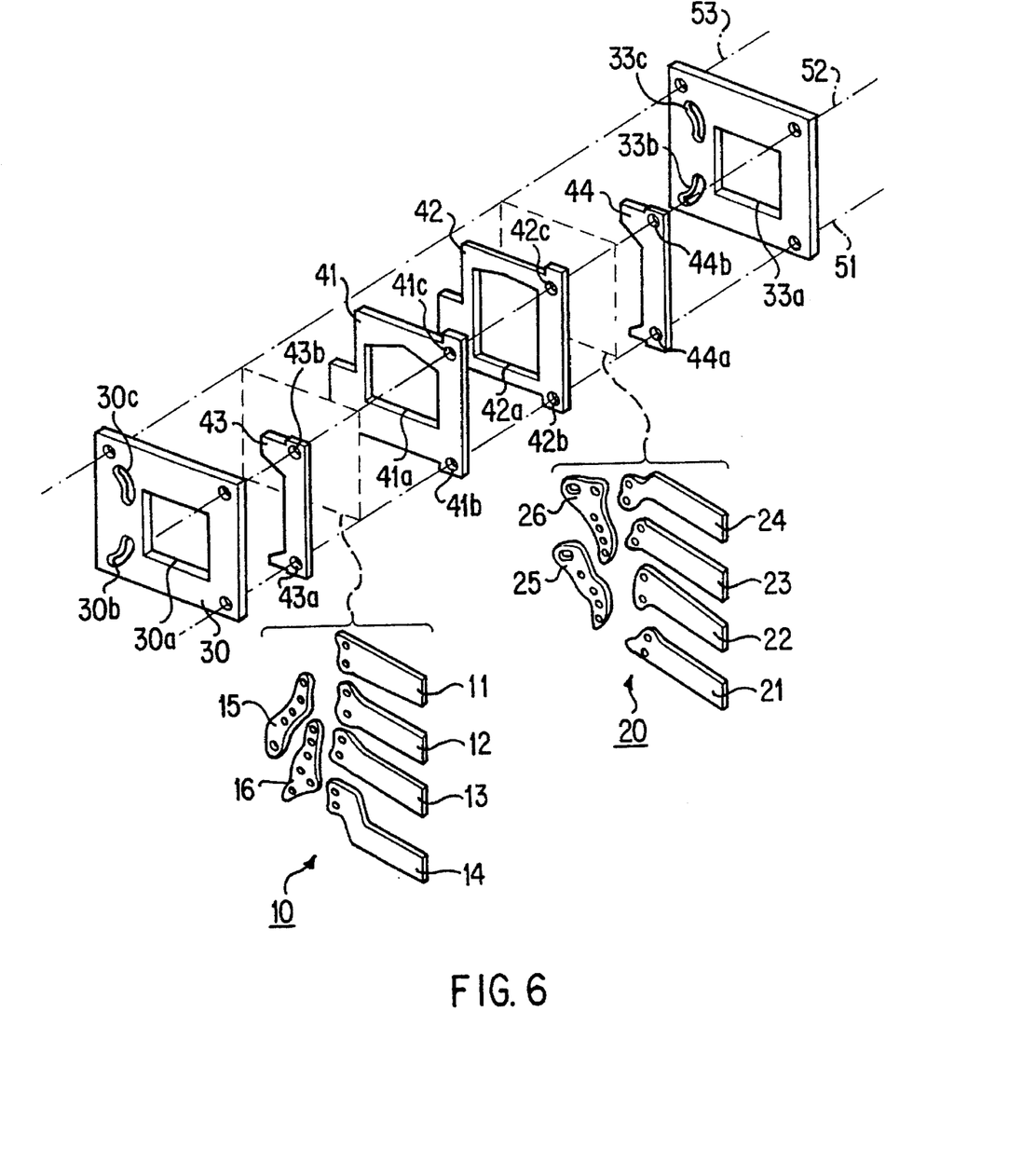
FIG. 6 is an oblique disassembled view showing the positional relationship between the two blade groups (front blind and rear blind) and the light shielding plate and intermediate plate in the focal plane shutter of the present invention.

In the present embodiment, a stiffness value for a rigidity of the FRP-type slit-forming blade 21a (with a thickness of 100 µm to 110 µm), was measured by a Teledyne Taber stiffness tester. The measured stiffness of the slit-forming blade 21a of the rear blind 20 was in a range of about 28 to 30 gcm.

In addition, when the acceptance rate of the slit-forming blade 21a of the rear blind 20 was measured, an improvement of approximately 20% was achieved over conventional methods. In other words, using conventional methods, the flatness acceptance rate was only about 50% to 60% because of rejections or the like due to defects in the CFRP itself and/or irregularities in the coating, but the flatness acceptance rate increased to 70% to 80% with the present embodiment.

The components are assembled onto the shutter base plate 30, and the focal plane shutter S shown in FIG. 1 is completed. A light shielding plate 41 and an intermediate plate 42 are located between the front blind 10 and the rear blind 20.

Repeated testing was carried out with the focal plane shutter S having the structure described above in which photography was carried out at a top shutter speed of 1/8000 second while the camera was moving, or in which the shutter was released while accelerating the camera in a direction substantially perpendicular to the direction of travel of the blades. Stable performance was achieved with no collision of the blades with the intermediate plate and/or the light shielding plate. In addition, no abnormalities were detected in the movement of the blades.

For comparison, a focal plane shutter having the following specifications was prepared: The front blind and rear blind had blades (corresponding to blades 11a–12a and 21a–22a) formed by stamping the specified blade shapes from CFRP with a thickness of 90 µm to 100 µm, and blades (corresponding to blades 13a–14a and 23a–24a) formed by stamping the specified blade shapes from aluminum alloy with a thickness of 50 µm to 70 µm. The other specifications are the same as the first embodiment. When photography was carried out with this focal plane shutter at a top shutter speed of 1/8000 second while the camera was moving, or when the shutter was released while accelerating the camera in a direction virtually perpendicular to the direction of travel of the blades, the blades collided with the intermediate plate and/or the light shielding plate.

In a second embodiment of the present invention, the front blind 10 has blades 11a–12a formed by stamping a specified blade shape from FRP having a thickness of 80 µm to 90 µm. Otherwise, the second embodiment is the same as the first embodiment. Repeated testing was also carried out with the second embodiment, in which photography was carried out at a top shutter speed of 1/8000 second while the camera was moving, or in which the shutter was released while accelerating the camera in a direction virtually perpendicular to the direction of travel of the blades. Stable performance was achieved with no collision of the blades with the intermediate plate or the light shielding plate. In addition, no abnormalities were detected in the travelling of the blades.

By using CFRP having a thickness of 80 µm to 90 µm in the slit-forming blade and the blade having the second largest amount of movement in the front blind, the charge energy is reduced from that of the first embodiment.

A third embodiment of the present invention has a slit-forming blade 21a among the dividing blades of the rear blind 20 that is formed by stamping a specified blade shape from CFRP with a thickness of 90 µm to 100 µm, and uses CFRP having a thickness of 80 µm to 90 µm for the blade having the second largest amount of movement. Otherwise, the third embodiment is substantially the same as the second embodiment. However, the carbon fibers of the CFRP used in the slit-forming blade of the rear blind have an elastic modulus of approximately 30000 kg/mm², while the carbon fibers in the CFRP of the other blades have an elastic modulus of approximately 24000 kg/mm². Repeated testing was also carried out with the third embodiment, in which photography was carried out at a top shutter speed of 1/8000 second while the camera was moving, or in which the shutter was released while accelerating the camera in a direction virtually perpendicular to the direction of travel of the blades. Stable performance was achieved with no collision of the blades with the intermediate plate or the light shielding plate. In addition, no abnormalities were detected in the movement of the blades. The stiffness value of the slit-forming blade of this embodiment was 33 to 38 gcm.

In addition, by using CFRP having a thickness of 90 µm to 100 µm for the slit-forming blade of the rear blind and using CFRP having a thickness of 80 µm to 90 µm for the blade having the second largest amount of movement, the charge energy was reduced from that of the first and second embodiments.

In a fourth embodiment of the present invention, CFRP having an elastic modulus of approximately 30000 kg/mm² and a thickness of 100 µm to 110 µm was used for the slit-forming blade of the rear blind and for the blades 13a and 23a, which have the top three largest amounts of movement among the blades of the front blind and rear blind. CFRP having an elastic modulus of approximately 30000 kg/mm² and a thickness of 70 µm to 80 µm was used for the slit-forming blade and second blade of the front blind and for the second blade of the rear blind. The fourth embodiment is otherwise substantially the same as the first embodiment. Repeated testing was also carried out with the fourth embodiment, in which photography was carried out at a top shutter speed of 1/8000 second, and again at 1/12000 second, while the camera was moving, or in which the shutter was released while accelerating the camera in a direction virtually perpendicular to the direction of travel of the blades. Stable performance was achieved with no collision of the blades with the intermediate plate or the light shielding plate. In addition, no abnormalities were detected in the movement of the blades.

In the fourth embodiment, the stiffness value of the third blade of the front and rear blinds and of the slit-forming blade 21a of the rear blind 20 was 35 to 43 gcm. The stiffness value of the slit-forming blade 11a and second blade 12a of the front blind 10 and of the second blade 22a of the rear blind 20 was 16–20 gcm.

In addition, when the blade acceptance rate was measured, the same type of high acceptance rate was achieved, as opposed to the case in which the slit-forming blade 21a and third blade 23a of the rear blind 20 were formed from a conventional aluminum alloy. Also, through the use of carbon fibers with a higher elastic modulus in the slit-forming blade 11a and second blade 12a of the front blind 10 and in the second blade 22a of the rear blind, the acceptance rate did not decrease even though the blades were thinner. In other words, as with the first embodiment, the overall acceptance rate was improved, and the cost was reduced while improving the functionality and reducing the charge energy.

In a fifth embodiment of the present invention, the FRP coating was eliminated from the blades 21–23, which are the blades among the dividing blades of the rear blind that have the first, second, and third largest amounts of movement. The fifth embodiment is otherwise virtually the same as the fourth embodiment. Repeated testing was also carried out with the fifth embodiment in which photography was carried out at a top shutter speed of 1/8000 second, and again at 1/12000 second, while the camera was moving, or in which the shutter was released while accelerating the camera in a direction virtually perpendicular to the direction of travel of the blades. Stable performance was achieved with no collision of the blades with the intermediate plate or the light shielding plate.

In the fifth embodiment, the blades were made lighter by the amount of the weight of the coating of the blades that was eliminated, and a reduction in charge energy was achieved.

The items which the above-described first embodiment through the fifth embodiment have in common will now be summarized and described in comparison to the conventional art.

Conventionally, the blade structure of the shutter cannot be balanced if the front blind and rear blind have the same weight, size and shape. Also, the shutter speed becomes unstable as the number of durability cycles is increased, and is not constant. Presently, shutters do not exist which have different structures in the front and rear blinds, in particular with regard to the slit-forming blades having the largest amounts of movement and the second and third blades. Most significantly, according to conventional reasoning, because the blades of both the front blind and rear blind are simultaneously made thicker when attempts are made to make the improvements described above by improving the blades, there is a fairly large increase in the charge energy and it becomes very difficult to apply the blades to shutters with speeds at or above 1/8000 second.

With the present invention, as a result of breaking from conventional reasoning and moving forward with testing, it was discovered that by varying and properly using the thickness and rigidity of each dividing blade of the front and rear blinds and adopting the structure of the present invention, no problems occurred even at speeds at or above 1/8000 second.

With the present invention, the rigidity of the slit-forming blades having the largest amount of movement among the blades of the front blind or the rear blind differ between the front blind and the rear blind, and the rigidity of the slit-forming blade of the rear blind is increased and is made larger than the rigidity of the slit-forming blade of the front blind. The movement characteristics of the rear blind are improved and shaking or oscillation of the blades during movement and directly after stopping also becomes smaller, so that opportunities for the blades to collide with and be damaged by the intermediate plate and/or the light shielding plate are reduced. Furthermore, and most importantly, the rigidity of the front blind is not increased but remains weak, and consequently, even if some shaking or oscillation of the blades occurs directly after the front blind stops, excessive shaking at the extreme edges of the intermediate plate and the light shielding plate does not occur. As a result, there are no collisions between the rear blind and the intermediate plate or the light shielding plate.

In addition, because it is easy to increase the rigidity of the slit-forming blades by increasing the thickness thereof, it is easy to achieve the above-described improvements. By thickening the blades, it is possible to increase the flatness acceptance rate of the blades. In other words, it is possible to increase the acceptance rate of the FRP-type blades and simultaneously achieve a reduction in cost.

If the slit-forming blade of the rear blind is made thicker in order to provide the necessary rigidity for high-speed movement, the blade chamber (the space in which the blade, an arm, or the like moves) of the existing shutter becomes too narrow, requiring the size of the shutter to be increased. Ultimately, the blades cannot be applied to the shutter except through carrying out large-scale design changes on the entire camera. In other words, improvements are difficult to obtain by changing only the blades.

Accordingly, in the present invention, the thickness of the slit-forming blade of the front blind is thin and the second blade is even thinner to create extra room in the blade chamber of the shutter. Thus, application to a shutter can be easily made, and it is possible to achieve the target effect of reducing the charge energy. The thickness of the second blade is preferably 50 µm to 120 µm, and more preferably 70 µm to 100 µm.

In addition, at speeds above 1/8000 second, chances of a blade striking the second blade increases through making the second blade thinner and there is a concern that shaking and oscillation may propagate throughout the entire blind. In the present invention, by making the blade with the third largest amount of movement thicker than the second blade among the front blind or rear blind and thereby increasing the rigidity of this blade, the chances of a blade striking the second blade is suppressed. Thus, shaking and oscillation of the blades during movement and directly after stopping is decreased, and there is no collision with or damage from the intermediate and light shielding plates. In this case, the thickness of the third blade is preferably 80 µm to 150 µm, and more preferably 100 µm to 130 µm.

In addition, the thickness of the blade with the second largest amount of movement and the thickness of the blade having the largest amount of movement in the front blind are equal, while the thickness of the blade having the third largest amount of movement and the thickness of the blade having the largest amount of movement in the rear blind are equal, and through this it is possible to unify the types of materials of the blades which are used. In other words, if there are a minimum of two types of blade materials used in producing the shutter of the present invention, it is possible to keep defective products caused by errors in materials and confusion in inventory management to a minimum. In other words, costs can be reduced.

In a super-high speed shutter having a maximum shutter speed at or above 1/8000 second, it has been learned that a stiffness value of the slit-forming blade of the rear blind is at least 28 to 30 gcm, and preferably 35 to 40 gcm, is necessary to avoid the danger of the above-described collisions and damage. Wherein the stiffness units are substantially proportionate to the value of the bending moment when a blade of span l=10 mm is bent by Φ=15° and are measured by a Teledyne Taber stiffness tester (Stiffness Tester V-5 Model 150-D). The stiffness units of the stiffness tester are normally the bending moment of 1/5 of the weight applied when the force of 15° bending is applied to a material 1.5 cm wide and 5 cm long. In the present invention, a value is used which has been measured by the stiffness tester when a 10 mm span has been bent 15° by fixing substantially the center of the blade in the blade shape and not applying the load which is applied when the rigidity is high. The average value is taken from when the span is bent 15° to the left and 15° to the right. A rough drawing of these measurements is shown in FIGS. 7a and 7b.

Figure 7A:
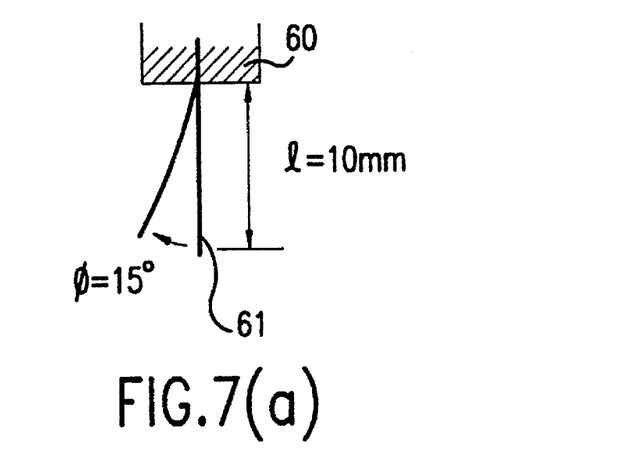
FIG. 7(a) is a frontal view showing the length and the bending angle ø of the focal plane shutter of the present invention.
Figure 7B:
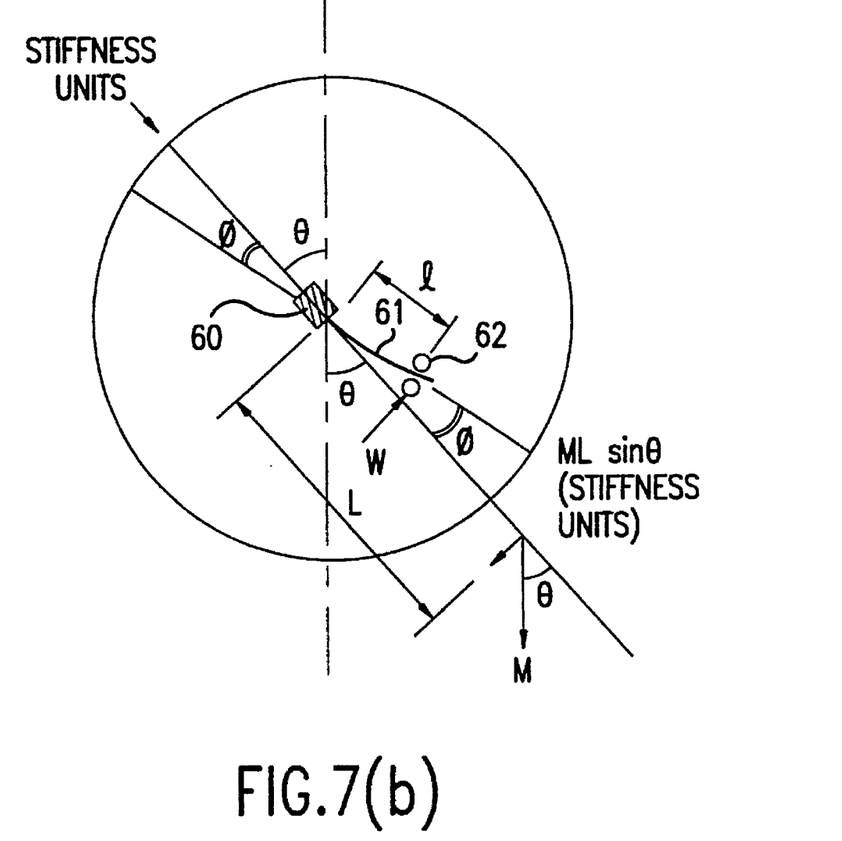
FIG. 7(b) is a frontal view showing the stiffness measurement on an embodiment of the focal plane shutter of the present invention.

FIGS. 7a and 7b show a rotatable testing material affixing clamp 60, a testing material 61, and a roller shaped forcing point 62 that applies bending force to the testing material. The higher the rigidity of the testing material, the larger the angle θ because 15° of bending is not applied to the testing material. As a result, the stiffness value, represented by Mlsinθ, becomes larger.

The shaking of the intermediate plate and the light shielding plate when the front blind is folded is suppressed by a dampening material or the like, yielding further efficacy.

The material of the light shielding blades is selected from the group comprising: FRP, lightweight metals such as titanium, aluminum alloy or the like, plastic, and lightweight ceramics. FRP is an abbreviation for fiber reinforced resin, and includes fibers and a matrix resin. The fibers can be continuous carbon fibers (CFRP), continuous aromatic group polyamide fibers, continuous super-high molecular weight polyethylene fibers, or the like. In particular, fibers other than carbon fibers can be used in intermediate layers. Additionally, continuous fibers need not be used in the middle layer in a 3-layer construction (consisting of a surface-side layer, a middle layer, and a back surface-side layer). Short fibers may be used instead.

Materials for the matrix resin include: (1) thermal plastic resin such as celluloid, cellulose acetate, cellulose propionate, cellulose butylate, 6-nylon, 6,6-nylon, ABS, AS resin, high density polyethylene, polypropylene, polyacetol, polycarbonate, polyethylene-terephthalate, polybutylene-terephthalate, polyether-ketone, polyether-ether-ketone, polysulfone, polyether-sulfone, polyether-imide, polyacrylate, polyamide-elastomer, ionomer, liquid crystal polymer, polyimide, polyamide-imide, fluorine resin, PPS, denatured polyphenylene oxide, or the like, or (2) thermal hardening resin such as epoxy resin, unsaturated polyester, polyurethane, polyimide, or the like.

When carbon fibers are used, because the carbon fibers are black, the FRP has somewhat of a light shielding characteristic. However, in order to increase the light shielding characteristic, when prepreg sheets are manufactured, carbon black may be added to and dispersed in the liquid resin. This is an intermediate material in matrix resins. Alternatively, the liquid resin with carbon black mixed in at a high density may be specially prepared and pressed into a normal prepreg sheet using a roll coater or the like. Carbon black is effective in improving the slickness of the blades. If the blades are slippery, friction is small even if the blades temporarily rub together.

It is preferable for the carbon black to have an average particle diameter of less than 0.07 μm, or even more preferable, less than 0.01 μm. The proportion of the carbon black in the liquid resin should be 3 to 15% by weight. Above 15% by weight, the alignment of the fibers becomes poor and results in adverse influences on the flatness. Also, because fluidity of the liquid resin becomes poor, air pockets can develop and separation can occur between layers. The proper amount of resin in a prepreg sheet is 30 to 50% by weight, or more preferably, 38 to 48% by weight. If the amount of resin is too low, air pockets and/or hairline cracks become externally visible, and the coatability worsens. Furthermore, because dips and bumps occur on the surface of the material, the friction durability and lubrication of the blades are decreased, and the appearance worsens even further. If the amount of resin is too low, when the resin flows, a striped pattern will appear, which also worsens the external appearance.

The amount of fibers in a prepreg sheet (the number of grams of fibers per 1 $m^2$) is from 10 $g/m^2$ to 60 $g/m^2$. The thickness of one layer of a prepreg sheet is about 15 to 70 μm. It is not necessary that all prepreg sheets have the same thickness. If the sheets are plane symmetrical about a neutral plane in the thickness direction, it is possible to combine various thicknesses and various fiber amounts. If the thickness falls in the established range, it becomes more advantageous to increase the thickness or amount of fiber in the intermediate layers in order to increase the overall bending rigidity.

Prepreg sheets are formed so that the direction of the fibers in the surface layers and intermediate layers is perpendicular to the direction of the fibers in the adjacent layers, and so that the sheets are plane symmetrical about a central plane in the thickness direction. At least 3 or more layers, for example, 3, 4, or 5 layers, are put together, and heated and pressed together. Thus the unhardened thermal hardening resin liquid becomes hardened. An FRP-type plate material (thickness 70 to 120 μm) is thus obtained.

Figure 2:
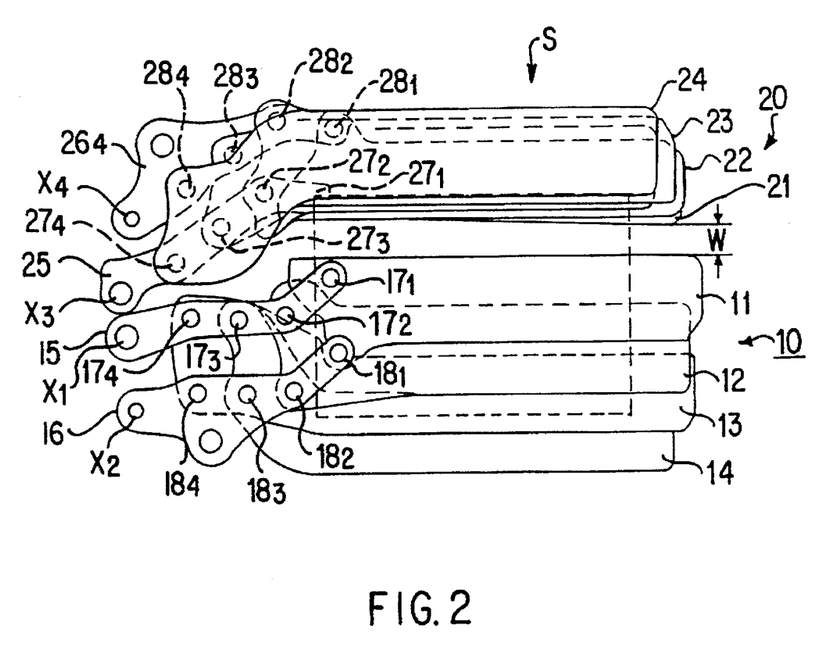
FIG. 2 is a frontal view showing the front blind and the rear blind in positions achieved during slit exposure in the focal plane shutter of the present invention.

Various materials are next stamped into specified light shielding blade shapes (refer to FIG. 1 and FIG. 2). About twenty to forty blades can be stamped from one sheet of material. In the case of FRP, the stamping is carried out in such a manner that the direction of the continuous fibers of the surface layers coincides with the lengthwise direction of the blades. When the blades are cut out, it is common to make a hole in the same manner through which a connecting pin can pass.

To increase the rigidity of the slit-forming blade of the rear blind, when FRP is used, it is more effective to not only increase the thickness, but to also increase the elastic modulus of the carbon fibers that are to be used. Because the mobility of the shutter will improve and shaking and oscillation will decrease if carbon fibers with a high elastic modulus are used and the thickness is also increased, it is obvious that the stability will increase at speeds at or above 1/8000 second. Similarly, if FRP is used which utilizes carbon fibers having a high rigidity for the second blade and third blade, it is possible to keep decreases in rigidity to a minimum even if the thickness is reduced, which is more preferable.

In the case of "through the lens" (TTL) multi-pattern light adjustment, light shielding blades that have been cut out are coated with a highly reflective coating on the front blind. A low reflection coating is applied to the edge surfaces, especially to the edge surface of the first blade which forms the slit. Application of the coating can be done efficiently by gathering the blades, setting the blades in a jig or the like, and applying the low reflection coating to only the slit side edge surfaces.

If the edge surface of the first blade which forms the slit has a high reflection coating, or if a highly reflective base material such as aluminum alloy or titanium is exposed, non-uniformities can easily occur in the dispersion reflectivity in the slit, and exposure irregularities can occur. It is hypothesized that this is because the dispersion reflectivity of highly reflective coatings differs according to the wavelength. In the case of FRP-type blades, because the dispersion reflectivity is not greater than 6%, there is no problem even if the FRP is exposed as is at the edge surfaces. The dispersion reflectivity of a high reflection coating is 7 to 30%, and the dispersion reflectivity of a low reflection coating is not greater than 7%, or preferably, not greater than 6%.

Furthermore, in the case of a rear blind with FRP-type blades, the blades may or may not be coated with a black, low reflection coating. Even if the blades are not coated with a low reflection coating, the dispersion reflectivity of the plastic itself is not greater than 6%, so no light leaks between the blinds, and there is no particular problem with moveability. In addition, it is more preferable to not coat the blades with a low reflection coating to minimize the weight. The present invention has been described in detail above using the preferred embodiments and with reference to the drawings. This disclosure is intended to be illustrative and not limiting.

With the above-described embodiments, it is possible to easily and more economically provide a super-high speed shutter faster than 1/8000 second which: (1) eliminates collisions with and damage of the blades by the intermediate plate and light shielding plate even under special usage conditions, (2) has an increased rate of acceptance of the blades and reduced costs, and (3) has extremely high durability and reliability. In addition, because it is also possible to reduce the charge energy, it is possible to increase the electrical capacity outside the shutter, so that new functions can be added.

As described above, with the focal plane shutter of the present invention, the rigidity of the slit-forming blade (21a) of the rear blind is increased and is made larger than the rigidity of the slit-forming blade (11a) of the front blind. In addition, the thickness blades (12a, 22a) having the second largest amount of movement is, in the front blind, the same as that of the blade (11a) having the largest amount of movement, and in the rear blind, is thinner than the blade (21a) having the largest amount of movement, and through this a focal plane shutter is obtained which has superior rigidity and weight balance. Thus, it is possible to provide a super-high speed shutter faster than 1/8000 second that eliminates collisions with and damage of the blades by the intermediate plate and light shielding plate, minimizes increases in the charge energy, has an increased rate of acceptance of the FRP and reduced costs, and has extremely high durability and reliability.

What is claimed is:

1. A focal plane shutter comprising:

a front blind and a rear blind each having a plurality of blades;

a driving mechanism that moves the front blind and the rear blind between an open position in which an exposure aperture is formed and a closed position in which the exposure aperture is covered;

at least one of said blades of the front blind having a larger range of movement than the other blades of the front blind; and at least one of said blades of the rear blind having a larger range of movement than the other blades of the rear blind;

wherein a blade having a largest range of movement of the rear blind has greater rigidity than a blade having a largest range of movement of the front blind, and wherein a thickness of the blade having a second largest amount of movement in the front blind is substantially equal to a thickness of the blade having the largest amount of movement in the front blind, and further wherein a thickness of a blade having a second largest amount of movement in the rear blind is thinner than the blade having the largest amount of movement in the rear blind.

2. A focal plane shutter of claim 1, wherein the thickness of the blade having the second largest amount of movement for both the front blind and the rear blind is 50 μm to 120 μm.

3. A focal plane shutter of claim 1, wherein the thickness of the blade having the second largest amount of movement in the rear blind and the thickness of the blade having the second largest amount of movement in the front blind are substantially equal.

4. A focal plane shutter of claim 1, wherein a blade of each of said front blind and said rear blind having a third largest amount of movement is thicker than the thickness of the blade having the second largest amount of movement in the front blind and rear blind, respectively.

5. A focal plane shutter of claim 4, wherein the thickness of the blade having the third largest amount of movement in both the front blind and the rear blind is about 80 μm to 150 μm.

6. A focal plane shutter of claim 5, wherein the thickness of the blade having the third largest amount of movement in the front blind and the thickness of the blade having the largest amount of movement in the rear blind are substantially equal.

7. A focal plane shutter of claim 1, wherein the blades comprise aluminum blades and fiber reinforced plastic blades.

8. A focal plane shutter comprising:

a front blind having a plurality of front dividing blades;

a rear blind having a plurality of rear dividing blades;

a mechanism for displacing the front and rear dividing blades to selectively define an exposure gap between at least one front slit-forming blade of said front blind and at least one rear slit-forming blade of said rear blind, wherein a rigidity of the rear slit-forming blade is different from a rigidity of the front slit-forming blade; and wherein thicknesses of two of said front dividing blades most displaced by said mechanism are substantially equal, and thicknesses of two of said rear dividing blades most displaced by said mechanism are different.

9. A focal plane shutter of claim 8, wherein said two most displaced rear dividing blades include a blade that is most displaced and a blade that is second most displaced, and said second most displaced blade has a thickness that is different from a thickness of the most displaced blade.

10. A focal plane shutter of claim 9, wherein the thickness of the second most displaced blade in the rear blind is less than the thickness of the most displaced blade in the rear blind.

11. A focal plane shutter of claim 8, wherein the rigidity of the rear slit-forming blade is greater than the rigidity of the front slit-forming blade.

12. A focal plane shutter of claim 9, wherein a thickness of a blade having a third largest displacement in each of the front and rear blind is greater than a thickness of a blade having a second largest displacement in each of the front and rear blind, respectively.

13. A focal plane shutter comprising:
 a front blind and a rear blind each having multiple dividing blades including a slit-forming blade, wherein the slit-forming blade of the front blind and the rear blind are movable with respect to each other to form a slit of a determined width between the front blind and the rear blind; and
 a driving mechanism that drives said front blind and said rear blind, wherein each slit-forming blade has a rigidity and the respective rigidities of the slit-forming blades of said front blind and said rear blind are different.

14. A focal plane shutter according to claim 13, wherein the rigidity of the slit-forming blade of said rear blind is greater than the rigidity of the slit-forming blade of said front blind.

15. A focal plane shutter according to claim 14, wherein the slit-forming blade of said rear blind is thicker than the slit-forming blade of said front blind.

16. A focal plane shutter assembly comprising:
 a base plate;
 a front blind movably connected to said base plate, said front blind having a front slit-forming blade; and
 a rear blind movably connected to said base plate, said rear blind having a rear slit-forming blade cooperable with said front slit-forming blade to establish an exposure slit therebetween;
 wherein said front slit-forming blade and said rear slit-forming blade have different rigidities.

17. A focal plane shutter according to claim 16, wherein said rear slit-forming blade is thicker than said front slit-forming blade.

18. A focal plane shutter according to claim 17, wherein a thickness of said front slit-forming blade is between about 80 μm and about 90 μm and a thickness of said rear slit-forming blade is between about 100 μm and about 110 μm.

19. A focal plane shutter according to claim 18, wherein said front slit-forming blade comprises a fiber reinforced plastic material and said rear slit-forming blade comprises a fiber reinforced plastic material.

20. A focal plane shutter according to claim 19, wherein the rear blind further comprises a plurality of rear dividing blades coupled to the rear slit-forming blade, one of said rear dividing blades adjacent said rear slit-forming blade having a thickness between about 80 μm and about 90 μm, and a remainder of said rear dividing blades are each made from aluminum each having a thickness between about 50 μm and about 70 μm.

21. A focal plane shutter according to claim 19, wherein the front blind further comprises a plurality of front dividing blades coupled to the front slit-forming blade, one of said front dividing blades adjacent said front slit-forming blade having a thickness between about 80 μm and about 90 μm, and being made from a fiber reinforced plastic material, and a remainder of the front dividing blades are each made from aluminum having a thickness between about 50 μm and about 70 μm.

22. A focal plane shutter according to claim 18, wherein said rear slit-forming blade is made from aluminum material having a stiffness between about 30 gcm and about 33 gcm.

23. A focal plane shutter according to claim 16, wherein said front blind further comprises a plurality of front dividing blades coupled to the front slit-forming blade, and wherein said front slit-forming blade and said front dividing blades are coated with a reflective material on a first surface and are coated on side edge surfaces and a second surface opposite said first surface with a non-reflective coating.

24. A focal plane shutter according to claim 23, wherein said reflective coating has a thickness between about 3 μm and about 6 μm and a reflection rate between about 7% and about 30%, and said non-reflective coating has a thickness between about 3 μm and about 6 μm and a reflection rate that is less than 15%.

25. A focal plane shutter according to claim 24, wherein said reflection rate of said non-reflective surface is less than or equal to 6%.

26. A focal plane shutter according to claim 23, wherein said rear blind further comprises a plurality of rear dividing blades coupled to said rear slit-forming blade, and wherein all surfaces of said rear blind blades have a non-reflective coating with a thickness between about 3 μm and about 6 μm and a reflection rate less than 15%.

27. A focal plane shutter according to claim 16, wherein said rear slit-forming blade has a stiffness between about 28 gcm and about 30 gcm.

28. A focal plane shutter according to claim 16, wherein said rear slit-forming blade has a stiffness between about 35 gcm and about 40 gcm.

29. A focal plane shutter according to claim 16, wherein said rear blind further comprises a plurality of rear dividing blades coupled to said rear slit-forming blade, each of said rear dividing blades comprising a fiber reinforced plastic material, and wherein a thickness of said rear slit-forming blade is between about 90 μm and about 100 μm and an elastic modulus of the fiber of said rear slit-forming blade is about 30000 kg/mm$^2$, with a remainder of said rear dividing blades having fiber with an elastic modulus of about 24000 kg/mm$^2$.

30. A focal plane shutter according to claim 16, wherein each of said front and rear blinds further includes at least a first blade, a second blade adjacent said first blade and a third blade adjacent said second blade, each of said first, second and third blades comprising a fiber reinforced plastic material, and wherein said front slit-forming blade defines said first blade of the front blind and said rear slit-forming blade defines said first blade of said rear blind, and further wherein said rear slit-forming blade and each said respective third blade, have fibers with an elastic modulus of approximately 30000 kg/mm$^2$ and a thickness of between about 100 and about 110 μm, and the fibers of each of said front slit-forming blade and the second blade of each of the front and rear blinds has an elastic modulus of approximately 30000 kg/mm$^2$ and a thickness of between about 70 and about 80 μm.

31. A focal plane shutter according to claim 30, wherein the third blade of each of the front and rear blinds and the rear slit-forming blade has a stiffness of between about 35 gcm and about 43 gcm, and the second blade of each of the front and rear blinds and the front slit-forming blade has a stiffness of between about 16 gcm and about 20 gcm.

32. A focal plane shutter according to claim 16, wherein said rear blind is formed without a non-reflective coating.

33. A focal plane shutter according to claim 16, wherein said front and rear slit-forming blades are formed from a fiber reinforced plastic material, said fiber reinforced plastic material including a resin and fiber, wherein said fiber includes carbon black material that has an average particle diameter of less than 0.07 µm, and a proportion of the carbon black material in the resin is approximately 3–15% by weight.

34. A focal plane shutter according to claim 33, wherein said resin comprises 30–50% of said fiber reinforced plastic material.

35. A method for forming a focal plane shutter of a camera having a front blind and a rear blind, each blind having a slit-forming blade and a plurality of dividing blades, said slit-forming blades being movable with respect to each other to form a slit of a predetermined width between the front and rear blinds, said method comprising:

selecting material for each of the blades according to each blade's relative degree of movement;

dimensioning the blades to reduce the possibility of collisions among the blades and with other components of the camera by dimensioning the front slit-forming blade to have a thickness that is less than a thickness of the rear slit-forming blade; and forming the blades using the selected material and dimensions.

36. A method according to claim 35, wherein said selecting further includes selecting a rigidity of said rear slit-forming blade to be greater than a rigidity of the front slit-forming blade.

37. A method for forming a focal plane shutter of a camera having a front blind and a rear blind, each blind having a slit-forming blade and a plurality of dividing blades, said slit-forming blades being movable with respect to each other to form a slit of a predetermined width between the front and rear blinds, said method comprising:

selecting material for each of the blades according to each blade's relative degree of movement;

dimensioning the blades to reduce the possibility of collisions among the blades and with other components of the camera; and forming a blade having a largest amount of movement of the rear blind with greater rigidity than a blade having a largest amount of movement of the front blind.

38. A method according to claim 37, wherein said dimensioning further includes selecting a thickness of a blade having a second largest amount of movement in the front blind to be substantially equal to a thickness of a blade having a largest amount of movement in the front blind.

39. A method according to claim 37, wherein said dimensioning further includes dimensioning the front slit-forming blade to have a thickness that is less than a thickness of the rear slit-forming blade.

* * * * *